(12) United States Patent
Hancock

(10) Patent No.: US 6,203,263 B1
(45) Date of Patent: Mar. 20, 2001

(54) TRANSPORT CRADLE FOR A SKID-SUPPORTED HELICOPTER

(76) Inventor: Anthony Hancock, 99 Harpendon Drive, Hatfield, Doncaster, DN7 4HN (GB)

(*) Notice: Subject to any disclaimer, the term of this patent is extended or adjusted under 35 U.S.C. 154(b) by 0 days.

(21) Appl. No.: 09/214,185

(22) PCT Filed: Jun. 30, 1997

(86) PCT No.: PCT/GB97/01833

§ 371 Date: Dec. 30, 1998

§ 102(e) Date: Dec. 30, 1998

(87) PCT Pub. No.: WO98/00335

PCT Pub. Date: Jan. 8, 1998

(30) Foreign Application Priority Data

Jul. 1, 1996 (GB) .................................................. 9613736

(51) Int. Cl.[7] ..................................................... B64F 1/22
(52) U.S. Cl. ........................... 414/458; 244/50; 414/495; 254/2 R; 280/43.23; 180/904
(58) Field of Search ..................... 414/495, 498, 414/426, 458, 459, 460, 461, 476; 180/904; 254/2 R; 244/1 R; 280/43.23, 43.17

(56) References Cited

U.S. PATENT DOCUMENTS

| 3,009,711 | 11/1961 | White | 280/43.23 |
| 3,529,736 | * 9/1970 | Lebre | 414/458 |
| 4,049,143 | * 9/1977 | Hatakka et al. | 414/458 |
| 5,135,346 | 8/1992 | Roach | 414/495 |
| 5,655,733 | * 8/1997 | Roach | 414/458 X |
| 5,678,977 | * 10/1997 | Nordlund | 414/458 |
| 6,019,565 | * 2/2000 | Gesuale | 414/458 |

* cited by examiner

Primary Examiner—Frank E. Werner
(74) Attorney, Agent, or Firm—Madson & Metcalf

(57) ABSTRACT

A transport cradle for a skid-supported helicopter having a pair of laterally spaced and generally parallel support skids. The transport cradle has a main frame (10) supported by transport wheels (16) and a pair of laterally spaced elongate supports (11) extending generally parallel to each other and forming part of the frame. The supports are each intended to engage and to lift a respective helicopter skid after the cradle has been presented to a helicopter supported on the ground by its skids. The cradle also comprises devices (13) for adjusting the spacing apart of the supports to correspond with the spacing apart of the helicopter skids. The cradle also has clamping devices (14, 15) provided on each support and operative to engage and clamp the respective skid to the support.

11 Claims, 4 Drawing Sheets

TRANSPORT CRADLE FOR A SKID-SUPPORTED HELICOPTER

This invention relates to a transport cradle for a skid-supported helicopter i.e. a helicopter having a pair of laterally spaced and generally parallel support skids.

In the design and manufacture of helicopters, reduction of weight is of paramount importance, given that the major part of the engine power is utilised to generate a sufficient lifting force by the rotor blades, and therefore any avoidable increase in "dead weight" of the helicopter represents a reduction in potential payload. This is particularly important in military and police applications, where on-board equipment e.g. weaponry and/or surveillance equipment are typical add-on pay loads.

It is therefore common practice to provide many types of helicopters with simple support skids, since this represents a substantial weight saving compared to a wheel-supported undercarriage to support the load of the helicopter on the ground.

However, while a helicopter is of course highly manoeuvrable in the air, it is a particularly awkward craft to handle and manoeuvre on the ground when it is supported by simple skids. Frequently, small helicopters have to be physically man-handled, when they are required to be moved from the place where they have landed e.g. to move the craft into a hanger. This is arduous work, and often is the cause of personal injury.

The invention therefore seeks to provide a transport cradle for a skid-supported helicopter and which is capable of engaging a set of helicopter skids on the ground, and then raising the skids off the ground so that the entire helicopter can be manoeuvred easily over the ground.

According to the invention there is provided a transport cradle for a skid-supported helicopter having a pair of laterally spaced and generally parallel support skids, said cradle comprising:

a main frame supported by transport wheels;

a pair of laterally spaced elongate supports extending generally parallel to each other and forming part of said frame, said supports each being intended to engage and to lift a respective helicopter skid after the cradle has been presented to a helicopter supported on the ground by its skids;

means for adjusting the spacing apart of the supports to correspond with the spacing apart of the helicopter skids; and clamping means provided on each support and operative to engage and to clamp the respective skid to the support.

Therefore, a transport cradle according to the invention can readily be moved over the ground to a standing helicopter via its transport wheels, and can then be manoeuvred so as to line up the supports alongside the respective skids. The clamping means are then operated to engage and to clamp the skids to the supports, and the cradle can then be moved over the ground via its transport wheels to move the helicopter to a required new position e.g. inside a hanger.

Preferably, the transport wheels are retractable between a ground engaging position and a raised position, so that when in the raised position any necessary lateral adjustment of the supports can take place to move the supports into close relationship to the respective skids. After completion of the clamping operation, the wheels can be lowered again (thereby lifting the helicopter via its skids), and allowing transport of the helicopter.

To facilitate lateral adjustment of the supports, preferably rotary support elements e.g. rollers may be mounted on the supports, and which are out of contact with the ground when the transport wheels are lowered, but which engage the ground when the transport wheels are raised.

The clamping means comprise suitable clamping elements which are preferably adjustably mounted on the supports so as to be movable into clamping engagement with the skids. It is often the case that helicopter skids are not exactly parallel to each other, but "toe-in" to a small extent, and the facility for the clamping elements to be adjusted relative to the support allows any necessary lateral clearance to be taken up as the clamping elements move into clamping engagement with the skids.

The main frame of the cradle (of which the elongate supports form a part) is preferably generally U-shaped as seen in plan, having a cross-member interconnecting facing ends of the supports, and preferably lowerable transport wheels are mounted on the opposite ends of the supports to the cross-member.

The cross-member preferably has a transport wheel arrangement which supports the cross-member at a required height above the ground, and the cross-member may be adjustable in height relative to the transport wheel arrangement, to correspond with any adjustment in height of the elongate supports via adjustment of their transport wheels.

Thus, for movement of the cradle over the ground, the transport wheels of the elongate supports will be lowered, and the cross-member also will be adjusted to corresponding height above the ground, so that the cradle can be presented to the helicopter skids. Lowering of the supports (by raising of the transport wheels), and corresponding lowering of the cross-member, then allows any necessary lateral adjustment of the supports via ground contact with their rollers. The axes of rotation of the rollers is generally parallel to the longitudinal axes of the supports, to permit necessary lateral adjustment of the supports.

One preferred means of lateral adjustment of the elongate supports comprises a telescopic adjustment incorporated into the cross-member.

In order to provide a powered cradle, i.e. a self propelled cradle, preferably the transport wheel arrangement of the cross-member comprises a power module driving a trolley wheel, which may be a battery operated arrangement. The wheel may also be steerable, so that the entire maneuvering of the cradle can be controlled via the trolley wheel.

A preferred embodiment of transport cradle for a skid-supported helicopter will now be described in detail, by way of example only, with reference to the accompanying drawings, in which.

Figure 1:
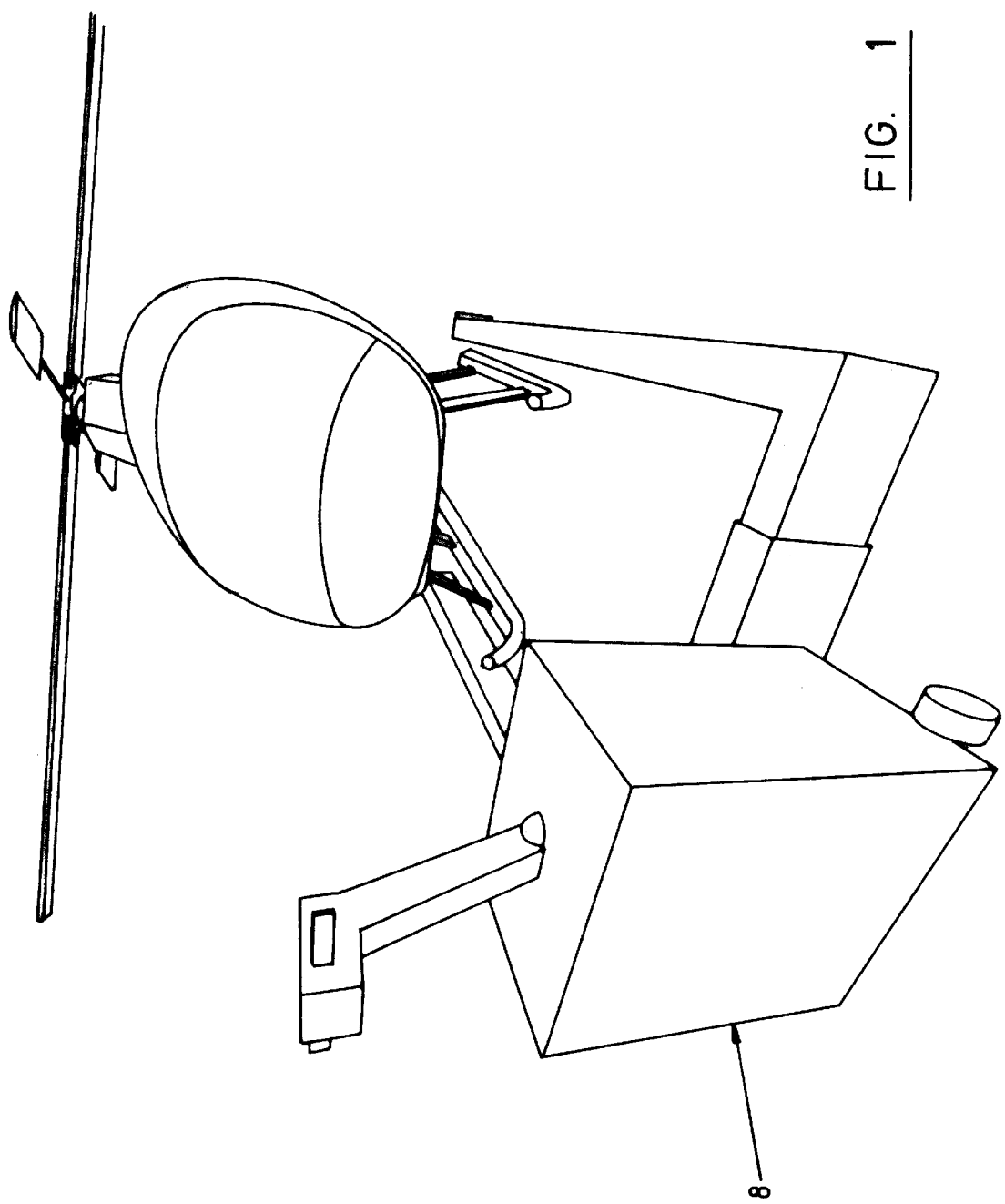
FIG. 1 is a schematic and perspective illustration of the transport cradle being maneuvered to a position of engagement with a pair of skids of a standing helicopter.

Referring now to the drawings, there will be described a preferred embodiment of helicopter transport cradle according to the invention, and as can be seen from the perspective illustration of FIG. 1, the cradle is generally U-shaped, seen in plan, and in which a pair of generally parallel elongate support arms of the cradle are presented to a pair of laterally spaced and generally parallel support skids of a helicopter, with each support arm extending alongside, but outwardly of the respective skid.

The cradle is designated generally by reference 10, and the pair of opposed, generally parallel supports are designated by reference 11, being interconnected at their facing ends 12 by a cross-member 13.

The supports 11 are intended each to engage and to lift a respective helicopter skid after the cradle 10 has seen presented to the helicopter standing on the ground via its skids.

Means is provided to adjust the spacing apart of the supports 11 to correspond with the spacing apart of the helicopter skids, and in the illustrated embodiment, this is achieved by incorporating a telescopic adjustment member 18 in the cross-member 13, which in the illustrated arrangement comprises a pair of ram operated adjuster rods.

Figure 2:
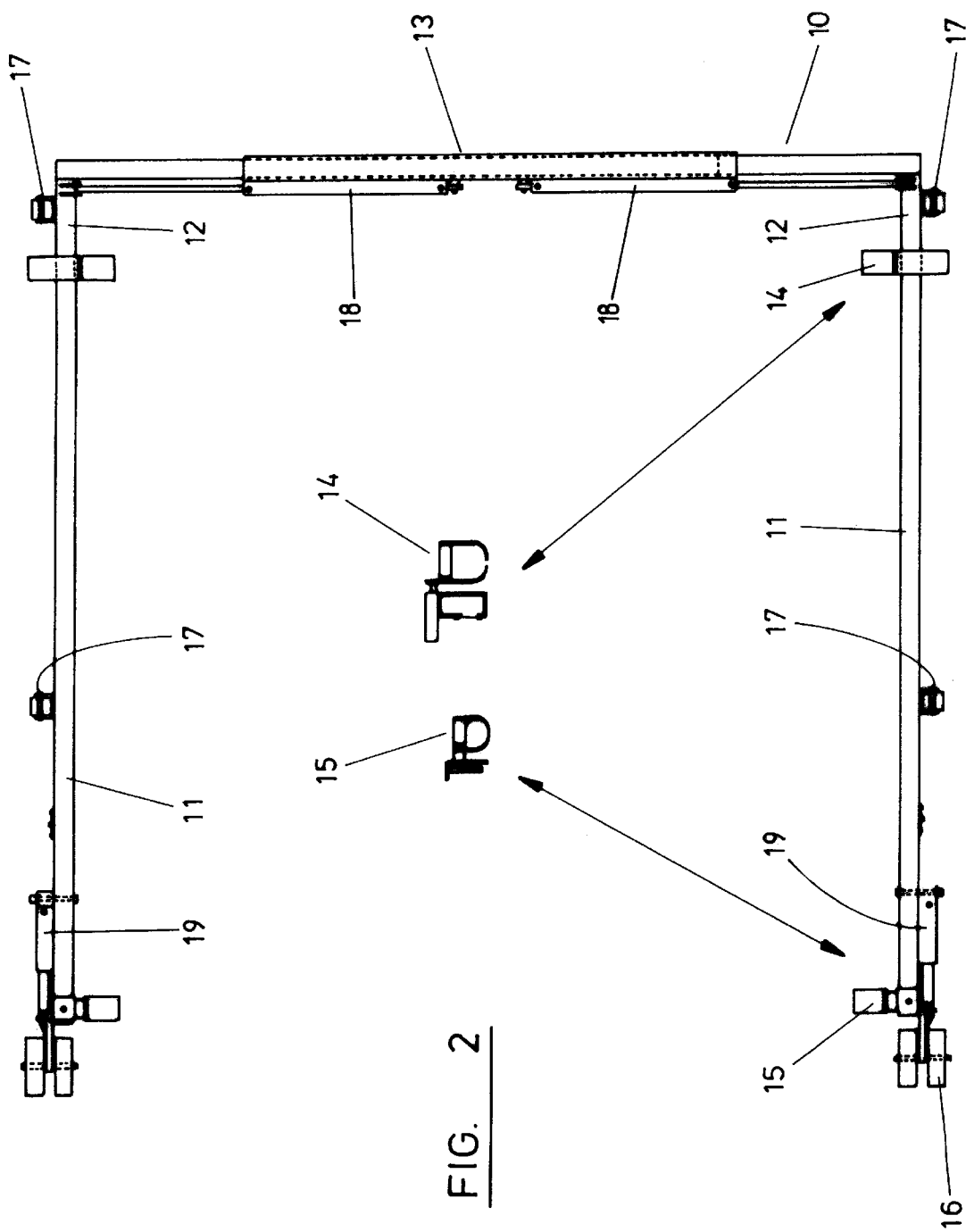
FIG. 2 is a plan view of the cradle, and showing it in more detail.

Clamping means is provided on each support 11, and operative to engage and to clamp the respective skid to the support. The clamping means are shown only schematically in FIGS. 2 and 3, with a larger clamping device 14 being arranged near end 12 of the support 11, and a smaller clamping device 15 near the opposite end.

The transport cradle 10 can be readily moved over the ground to a standing helicopter, and then be maneuvered so as to line up the supports 11 alongside the helicopter skids. The clamping means 14, 15 are then operated to engage and to clamp the skids to the supports, and the cradle can then be moved over the ground to move the helicopter to a required new position.

Figure 3:
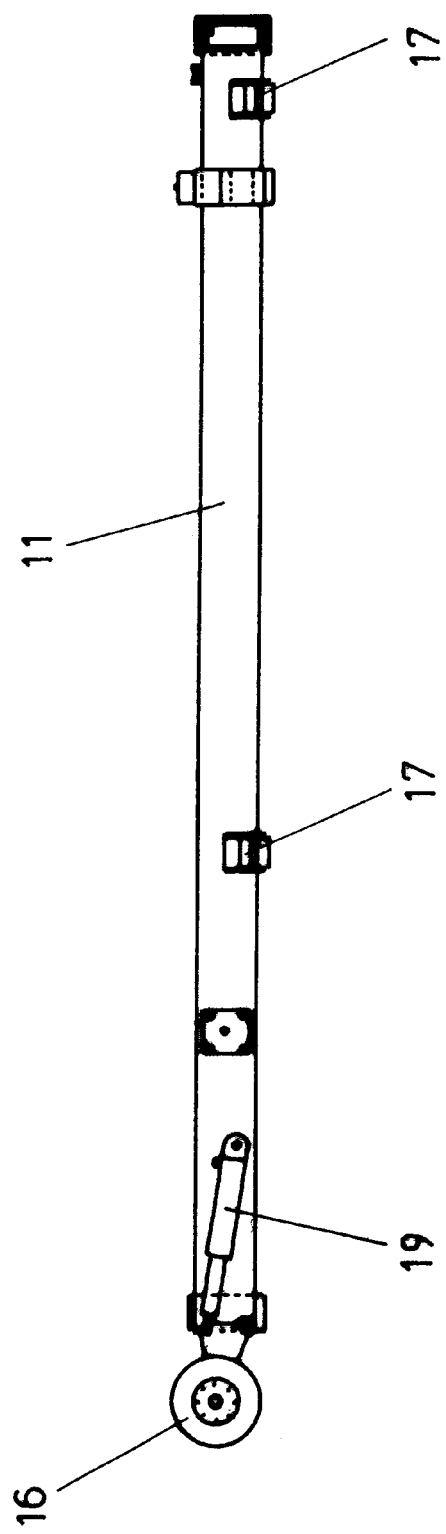
FIG. 3 is a side view of one of a pair of parallel elongate support arms of the cradle shown in FIG. 2.
Figure 4:
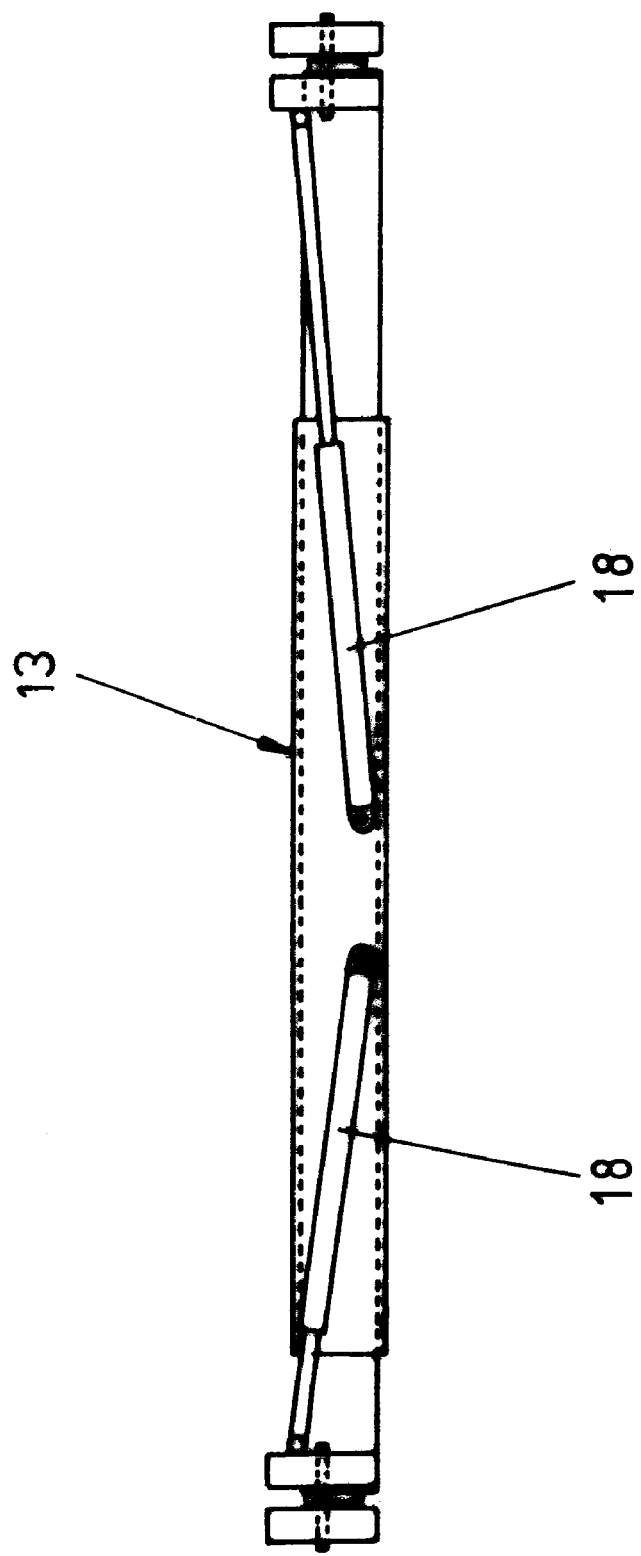
FIG. 4 is an end view of a cross-member of the generally U-shaped cradle shown in FIG. 2.

The supports 11 are provided with retractable transport wheels 16, and which can move between a ground engaging position and a raised position (as shown in FIG. 3). When in the raised position, any necessary lateral adjustment of the supports 11 can take place, to move the supports 11 into close relationship to the respective skids so that the clamping operation can take place. After completion of the clamping operation, the wheels can be lowered (thereby lifting the helicopter via its skids) and allowing transport of the helicopter.

Lateral adjustment of the supports 11 is obtained by providing suitable rotary support elements, which in the illustrated embodiment comprise rollers 17 having axis of rotation extending parallel to the longitudinal axes of the supports 11. Rollers 17 are out of contact with the ground when the transport wheels 16 are lowered, but engage the ground when the transport wheels are raised, to allow lateral adjustment of the supports 11 upon operation of the telescopic adjustment members 18 attached to the cross-member 13.

The support of the cradle 10 is achieved, for transport over the ground, not only via the transport wheels 16, when in the lowered position, but also by a transport wheel arrangement which supports the cross-member 13. The transport wheel arrangement supporting the cross-member 13 is shown schematically in the perspective illustration of FIG. 1.

The transport wheel arrangement supports the cross-member 13 at a required height above the ground, and the cross-member 13 is capable of being adjustable in height relative to the wheel arrangement, to correspond with the height above the ground of the supports 11 via their transport wheels, so that the cradle can be presented to the helicopter skids. Lowering of the supports 11, by raising the wheels 16, and followed by lowering of the cross member 13, allows lateral adjustment of the supports 11 over the ground via contact with the ground of their rollers 17.

The cradle of the invention may be arranged to be manually manoeuvrable, but preferably it is a self propelled cradle, and this may be achieved by providing a motor-driven trolley wheel module 8 to support the cross-member 13. This may be a battery operated module. The module 8 may have a steerable wheel, so that the entire manoeuvring of the cradle can be controlled via the wheel supported module 8.

A helicopter transport cradle according to the invention can be utilised as ground handling unit for all types of skid mounted helicopters. It has been designed to give the operator maximum control, with minimum effort, affording maximum protection for both the payload, and the operator.

The power source for the self propelled unit may be a 24 volt DC rechargeable battery, which requires minimal maintenance and overnight charging only.

Drive may be from an electric motor and reduction box, controlled by a combined directional and proportional switch, through an integrated speed control board, enabling the unit to be capable of adjustment from moving from a slow "snail pace" to a fast walking speed of 5 mph.

Lift control may be achieved by electro-hydraulic operating rams 19, controlled by lever operated directional spool valves.

Steering may be achieved by operating a moving yoke system, giving the operator simple steering movements, with either hand controlling forward and reverse travel. Controlling the direction may be a "point and steer" operation or simple visual reference, and be capable of turning 90° left or right. This will permit turns of 360° to be performed, generally around a centre of gravity of the helicopter in either direction.

The width adjustment of the supports may be hydraulic, using a typical telescopic movement, and each support is controlled individually, to bring the support generally alongside the respective skid of the helicopter, regardless of whether it is "toe-in" or "toe-out". The adjustable clamping devices on the supports allow the respective skids to be engaged and firmly clamped to the supports, prior to raising of the supports relative to the ground.

An important aspect of the transport cradle is that it can pick up a helicopter by travelling down both sides of the helicopter, on the outsides of the skids, rather than down the centre. This is done for two reasons.

First of all, from the safety point of view, by approaching and picking up a helicopter in this way, effectively a wheel support is provided at each corner of the skid arrangement. This supports the helicopter with such stability that even quick 90° turns, and sudden directional changes, can be executed without risk of loss of stability (subject to structural surroundings).

Secondly, it gives convenience to the helicopter operator. By using this method, it means that expensive accessories, such as cameras, search lights, belly hooks and weapon cradles can all be catered for, without fear of damage caused by the handling unit, since such accessories are normally supported in-board of the skids. Also, the facility for adjusting the separation of the supports allows the cradle to be used with different designs of helicopters automatically, whilst being in full view of the operator.

What is claimed is:

1. A helicopter transport cradle for a skid-supported helicopter having a pair of laterally spaced and generally parallel support skids, the cradle comprising:
   a main frame supported by lowerable transport wheels;
   a pair of laterally spaced elongate supports having a longitudinal axis extending generally parallel to each other and forming part of the main frame, the supports each being intended to engage and to lift a respective helicopter skid after the cradle has been presented to the helicopter supported on the ground by its skids, in which the main frame is generally U-shaped as seen in plan and has a cross-member interconnecting facing ends of the supports;

means for adjusting the spacing apart of the supports to correspond with the spacing apart of the helicopter skids;

clamping means provided on each support and operative to engage and clamp the respective skid to the support;

rotary support elements mounted on the supports and having an axis of rotation substantially parallel to the longitudinal axis of the supports; and a cross member transport wheel arrangement including a power module driving a trolley wheel, in which the trolley wheel is steerable, so that the entire maneuvering of the cradle can be controlled via the trolley wheel.

2. A cradle as claimed in claim 1, in which the transport wheels are retractable between a ground engaging position and a raised position, so that when in the raised position any lateral adjustment of the supports can take place to move the supports into close relationship to the respective skids.

3. A cradle as claimed in claim 2 in which the rotary support elements are out of contact with the ground when the transport wheels are lowered, but engage the ground when the transport wheels are raised.

4. A cradle as claimed in claim 1, in which the clamping means comprise clamping elements adjustably mounted on the supports so as to be moveable into clamping engagement with the skids.

5. A cradle as claimed in claim 4, in which the clamping elements are adjustable relative to the supports to provide clamping engagement for non-parallel skids.

6. A cradle as claimed in claim 1, in which the lowerable transport wheels are mounted on the opposite ends of the supports to the cross-member.

7. A cradle as claimed in claim 1, in which the cross-member transport wheel arrangement supports the cross-member at a required height above the ground, and the cross-member may be adjustable in height relative to the transport wheel arrangement, to correspond with any adjustment in height of the elongate supports via adjustment of their transport wheels.

8. A cradle as claimed in claim 1, in which the means for adjusting the spacing apart of the supports comprises a telescopic adjustment member attached to the cross-member.

9. A cradle as claimed in claim 1, in which the transport wheel arrangement of the cross-member is a battery operated arrangement.

10. A cradle as claimed in claim 1, further comprising a plurality of rotary support elements mounted on the supports which rotary support elements are configured to allow lateral re-positioning of the cradle after the cradle has been presented to the helicopter supported oil the ground by its skids.

11. A helicopter transport cradle for a skid-supported helicopter having a pair of latterally spaced and generally parallel support skids, the cradle comprising:

a main frame supported by lowerable transport wheels;

a pair of laterally spaced elongate supports extending generally parallel to each other and forming part of the main frame, the supports each being intended to engage and to lift a respective helicopter skid after the cradle has been presented to the helicopter supported on the ground by its skids, in which the main frame is generally U-shaped as seen in plan and has a cross-member interconnecting facing ends of the supports;

means for adjusting the spacing apart of the supports to correspond with the spacing apart of the helicopter skids;

clamping means provided on each support and operative to engage and clamp the respective skid to the support which clamping means can be adjusted laterally and longitudinally in relation to the supports to provide clamping engagement for non-parallel skids;

a plurality of rotary support elements mounted on the supports and having an axis of rotation substantially parallel to the longitudinal axis of the supports; and a cross member transport wheel arrangement including a power module driving a trolley wheel, in which the trolley wheel is steerable, so that the entire maneuvering of the cradle can be controlled via the trolley wheel.

* * * * *